United States Patent [19]

Uchiyama et al.

[11] Patent Number: 4,984,820

[45] Date of Patent: Jan. 15, 1991

[54] DAMPING FORCE CONTROL SYSTEM FOR SHOCK ABSORBER VARIABLE WITH FREQUENCY OF VEHICLE HEIGHT DIFFERENCE EXCEEDING LIMIT VALUE

[75] Inventors: Hiromitsu Uchiyama; Masayuki Kawamoto, both of Toyota; Yoriko Inada, Nagoya, all of Japan

[73] Assignee: Toyota Jidosha Kabushiki Kaisha, Aichi, Japan

[21] Appl. No.: 381,328

[22] Filed: Jul. 18, 1989

[30] Foreign Application Priority Data

Jul. 22, 1988 [JP] Japan .................................. 63-183087
Oct. 28, 1988 [JP] Japan .................................. 63-272740
Dec. 15, 1988 [JP] Japan .................................. 63-317118

[51] Int. Cl.$^5$ ............................................. B60G 17/08
[52] U.S. Cl. ................................. 280/707; 364/424.05
[58] Field of Search ......... 280/707, 702, 714, DIG. 1, 280/702; 364/424.05; 188/299

[56] References Cited

U.S. PATENT DOCUMENTS

| | | | |
|---|---|---|---|
| 4,600,215 | 7/1986 | Kuroki et al. | 280/707 |
| 4,685,689 | 8/1987 | Takizawa et al. | 280/707 |
| 4,714,272 | 12/1987 | Buma et al. | 280/707 |
| 4,717,173 | 1/1988 | Sugasawa et al. | 280/707 |
| 4,749,210 | 6/1988 | Sugasawa et al. | 280/707 |
| 4,756,549 | 7/1988 | Kurosawa et al. | 280/707 |
| 4,770,438 | 9/1988 | Sugasawa et al. | 280/707 |
| 4,834,419 | 5/1989 | Kozaki | 280/707 |

FOREIGN PATENT DOCUMENTS

| | | |
|---|---|---|
| 61-184113 | 8/1986 | Japan . |
| 61-287808 | 10/1986 | Japan . |
| 62-11010 | 1/1987 | Japan . |
| 62-168704 | 7/1987 | Japan . |
| 62-258806 | 11/1987 | Japan . |
| 62-265012 | 11/1987 | Japan . |
| 63-116919 | 5/1988 | Japan . |
| 63-154414 | 6/1988 | Japan . |

Primary Examiner—Charles A. Marmor
Assistant Examiner—Karin Tyson

[57] ABSTRACT

In a damping force control system for switching over a shock absorber in the suspension of a vehicle from a low damping force operation to a high damping force operation when a vehicle height difference exceeds a certain limit value, the frequency of the vehicle height difference exceeding the certain limit value is counted for each certain cycle period, and the shock absorber is controlled to provide the high damping force operation for a time duration in each cycle period, the ratio of the time duration to the cycle period being varied in accordance with the frequency so that the ratio is increased along with an increase of the frequency.

10 Claims, 13 Drawing Sheets

DAMPING FORCE CONTROL SYSTEM FOR SHOCK ABSORBER VARIABLE WITH FREQUENCY OF VEHICLE HEIGHT DIFFERENCE EXCEEDING LIMIT VALUE

BACKGROUND OF THE INVENTION

1. Field of the Invention

The present invention relates to a shock absorber incorporated in a suspension system of a vehicle such as an automobile, and more particularly, to a damping force control system for such a shock absorber.

2. Description of the Prior Art

In Japanese Patent Laying-open Publication 61-287808 there is disclosed a damping force control system for a shock absorber incorporated in a suspension system of a vehicle such as an automobile which is adapted to switch over the damping force of the shock absorber to a high level when the relative displacement between the wheel and the vehicle body has increased beyond a predetermined limit value. In such a damping force control system the limit value for switching over the damping force of the shock absorber is determined from the view point of comfortableness in riding and stability in maneuvering while the durability of the shock absorber and the actuator therefor have not been much regarded. Therefore, when the vehicle runs on a rough road such as an unpaved road, the switching over of the damping force between a low level and a high level occurs at a very high frequency, causing a problem that the durability of the shock absorber and the actuator therefor is low.

In view of such a problem it has also been proposed in the above-mentioned Japanese patent laying-open publication to vary the limit value of the relative movement between the vehicle wheel and the vehicle body for switching over the damping force from a lower level to a higher level to be higher as the frequency of the switching over increases. By this arrangement the frequency of the switching over of the damping force between the lower level and the higher level decreases. However, as a result it occurs that the vehicle runs on a rough road for a long time with a lower damping force with a poor stability in maneuvering.

SUMMARY OF THE INVENTION

In view of the above-mentioned problems it is the primary object of the present invention to provide a damping force control system for a shock absorber which is improved so as to obtain high comfortableness in riding and high stability in maneuvering of the vehicle without sacrificing the durability of the shock absorber and the actuator therefor.

According to the present invention, the above-mentioned object is accomplished by a damping force control system for a shock absorber mounted between a vehicle wheel and a vehicle body of a vehicle such as an automobile and adapted to selectively provide a high damping force operation or a low damping force operation, comprising a vehicle height difference detecting means for detecting a vehicle height difference of the vehicle body relative to the vehicle wheel, and a shock absorber control means for controlling said shock absorber to provide said high damping force operation or said low damping force operation, said shock absorber control means controlling said shock absorber to provide said high damping force operation when said vehicle heigt difference exceeds a certain limit value, wherein said shock absorber control means controls said shock absorber to provide said high damping force operation continually for a longer time duration along with increase of a frequency of said vehicle height difference exceeding said certain limit value in a certain time duration.

According to the above-mentioned damping force control system, when the vehicle runs on a very rough road, the shock absorber tends to continually operate at the high damping force with less frequency of switching over between the high damping force operation and the low damping force operation as the frequency of the vehicle height difference exceeding the certain limit value in said certain time duration increases, thus improving the durability of the shock absorber and the drivability in maneuvering on rough roads, while high comfortableness in riding is ensured on normal roads.

According to an embodiment of the present invention, said shock absorber control means may control said shock absorber to provide said high damping force operation continually for said certain time duration when said frequency exceeds said certain value.

In such an embodiment, said certain limit value may be decreased along with increase of vehicle speed.

According to another embodiment of the present invention, said shock absorber control means may control said shock absorber to provide said high damping force operation continually for a renewed certain time duration every time when said vehicle height difference exceeds said certain limit value while said shock absorber is still providing said high damping force operation.

According to still another embodiment of the present invention, said shock absorber control means may control said shock absorber to provide said high damping force operation continually for a renewed certain time duration every time when said vehicle height difference exceeds said certain limit value while said shock absorber is still providing said high damping force operation unless said frequency exceeds said certain limit value, and to provide said high damping force operation continually for said certain time duration when said frequency exceeds said certain limit value.

According to an aspect of the present invention, said certain time duration for counting said frequency may be based upon a cycle period for repetitive control operation of the damping force control system.

Alternatively, said certain time duration for counting said frequency may be based upon a distance run by the vehicle.

According to another aspect of the present invention, said certain limit value for said vehicle height difference may be increased along with increase of said frequency at least until said frequency reaches a certain value.

According to still another aspect of the present invention, said certain limit value for said vehicle height difference may be decreased along with increase of vehicle speed for a same value of said frequency.

In the above-mentioned embodiments, said shock absorber control means may control said shock absorber to provide said high damping force operation after the lapse of a determinate delay time from a time point when said vehicle height difference exceeds said certain limit value.

BRIEF DESCRIPTION OF THE DRAWINGS

In the accompanying drawing.

DESCRIPTION OF THE PREFERRED EMBODIMENTS

In the following the present invention will be described in more detail with respect to some preferred embodiments and with reference to the accompanying drawings.

Figure 1:
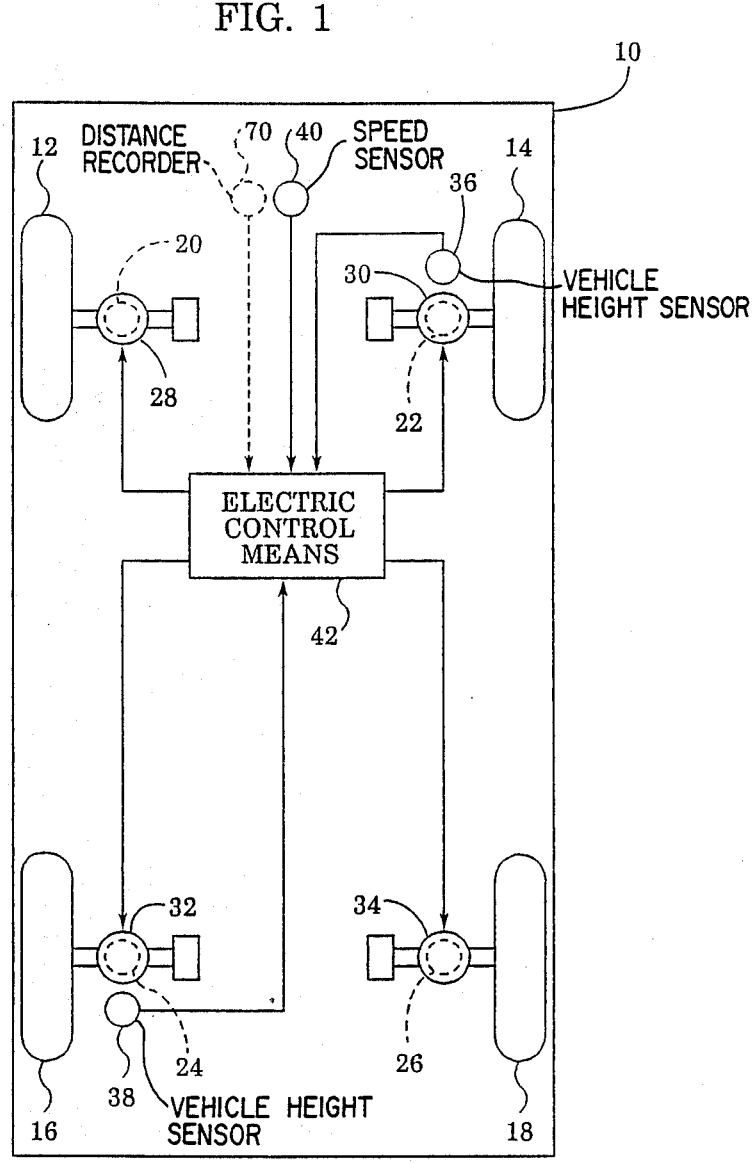
FIG. 1 is a diagrammatical plane view showing a vehicle with suspension shock absorbers and actuators for controlling the damping force thereof together with a damping force control system according to the present invention.

Referring first to FIG. 1, a vehicle body 10 is supported by a front left wheel 12, a front right wheel 14, a rear left wheel 16 and a rear right wheel 18. Suspension systems for the wheels 12-18 incorporate shock absorbers 20, 22, 24 and 26, respectively, and these shock absorbers are equipped with actuators 28, 30, 32 and 34, respectively, for switching over the shock absorbers between a first condition for providing a low damping force and a second condition for providing a high damping force. In the shown embodiment the vehicle height, i.e. the relative displacement between the vehicle wheel and the vehicle body, at a front portion of the vehicle is detected by a vehicle height sensor 36 incorporated in a suspension system for the front right wheel 14, and the vehicle height at a rear portion of the vehicle is detected by a vehicle height sensor 38 incorporated in the suspension system for the rear left wheel 16. The vehicle speed is detected by a vehicle speed sensor 40. Further, as is required in a later embodiment, a distance recorder 70 for detecting the distance run by the vehicle such as a mileage recorder may be additionally provided. These sensors provide output signals to an electric control means 42 which controls the actuators 28-34 based upon the signals received from the sensors.

Figure 2:
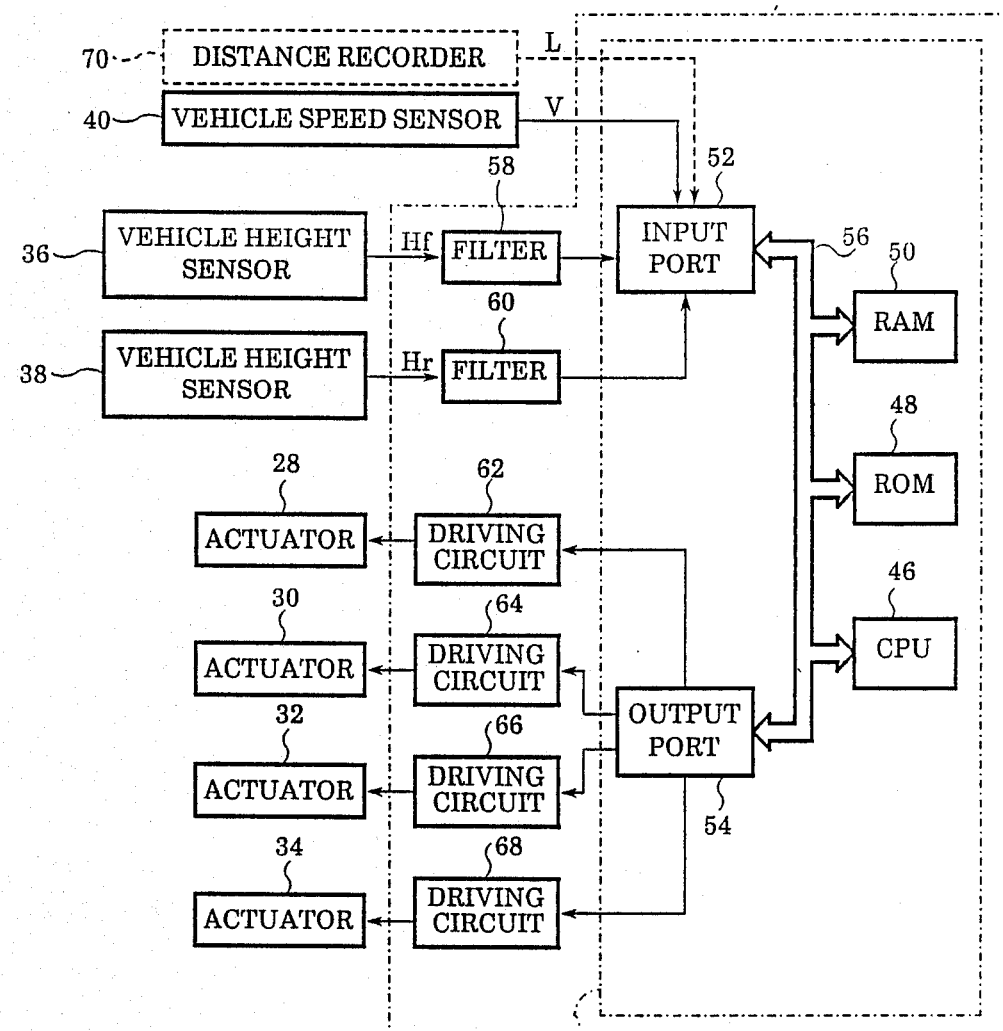
FIG. 2 is a block diagram showing an electric control system in the damping force control system shown in FIG. 1.

As shown in FIG. 2, the electric control means 42 comprises an electronic micro computer 44 which itself is of a common construction in this art and includes a central processing unit (CPU) 46, a read only memory (ROM) 48, a random access memory (RAM) 50, an input port means 52, an output port means 54 and a common bus 56 interconnecting these elements.

The vehicle speed sensor 40 supplies a signal representing vehicle speed V to the input port means 52. The vehicle height sensors 36 and 38 supply signals representing front vehicle height Hf and rear vehicle height Hr to the input port means 52 through filters 58 and 60, respectively. These filters remove high frequency components such as more than 1-2 Hz which are resonant frequencies of the vehicle body and a direct current component corresponding to the static load on the vehicle variable with the number of passengers from the signals supplied to the input port 52. ROM 48 stores a program for conducting a control operation such as shown in the flowchart in FIG. 3 and a map for a relation between variables such as shown in FIG. 4. CPU 46 conducts a computing operation with assistance of ROM 48 and RAM 50 based upon the data supplied through the input port means 52 so as to output control signals toward the output port means 54.

In the following several embodiments of the damping force control system for the shock absorber according to the present invention will be described in the form of operations thereof in accordance with flowcharts showing the control processes carried out by the system according to the invention. Further, for the sake of convenience and clarity of the description and illustration, in the following the invention will be described only about the shock absorbers for the front wheel suspension. However, it will be understood that the same or similar control may also be applied to the shock absorbers for the rear wheel suspension according to an appropriately alternated order of repetition therebetween. Therefore, it is to be noted that the present invention is not limited to the damping force control for the shock absorbers in the front suspension of a vehicle. Further, for the same purposes of convenience and clarity, it is assumed that the same damping force control is given to the shock absorbers 20 and 22 for the front left and right wheels 12 and 14 based upon the output signal from the front vehicle height sensor 36.

Figure 3:
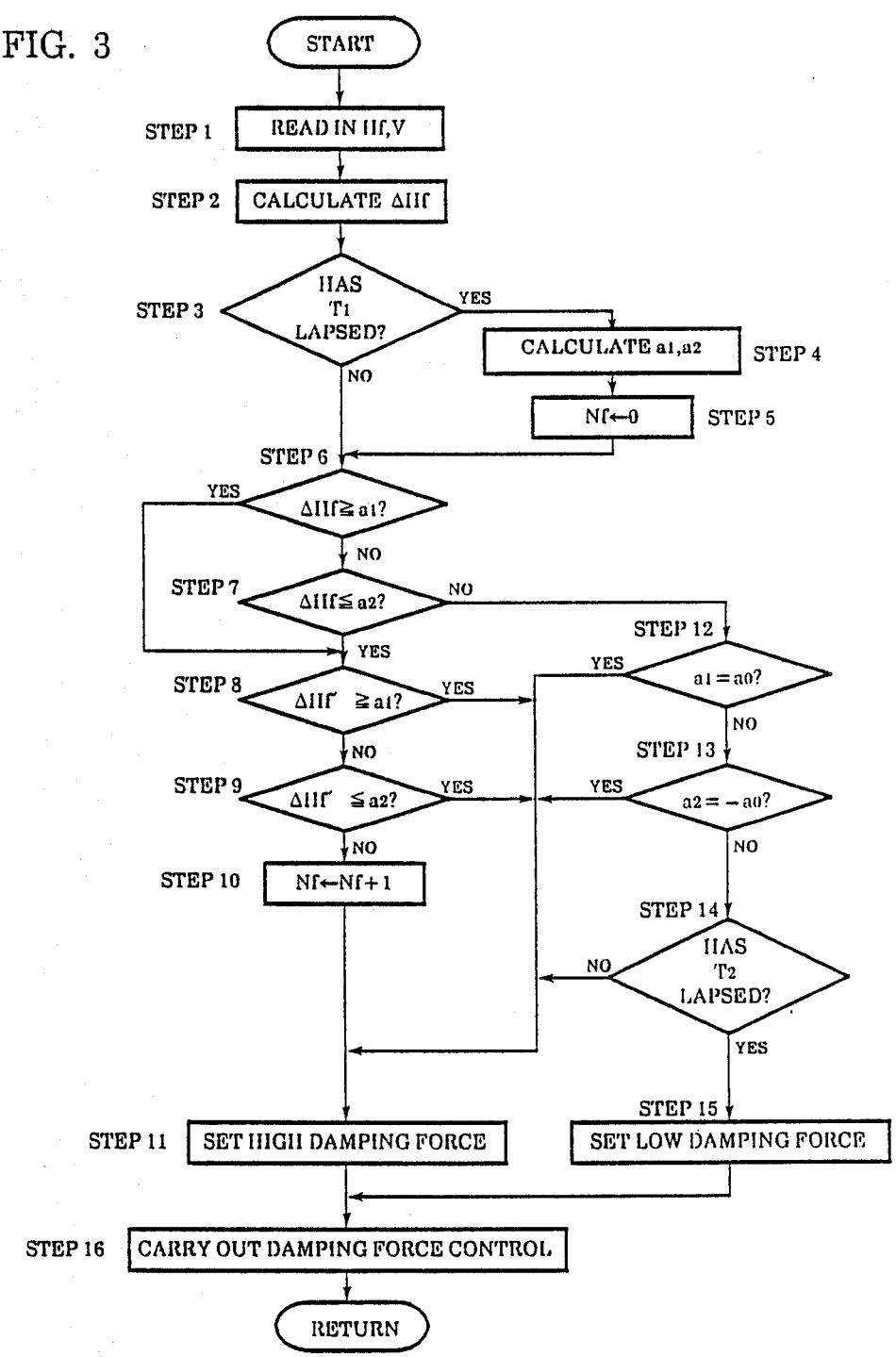
FIG. 3 is a flowchart showing the control operation of an embodiment of the damping force control system according to the present invention.
Figure 4:
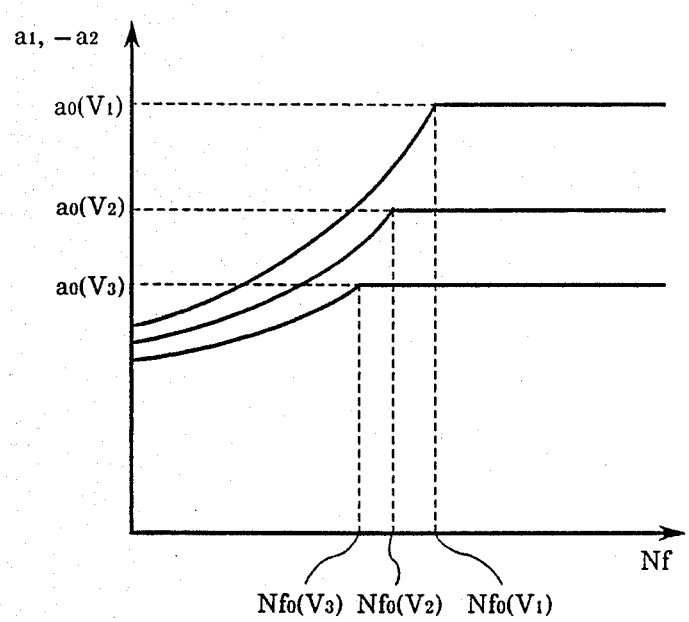
FIG. 4 is a graph showing a relationship between the frequency of the displacement between the vehicle wheel and the vehicle body exceeding a predetermined limit value and the level of the limit value determined for the control of switching over of the damping force according to the flowchart in FIG. 3.
Figure 5:
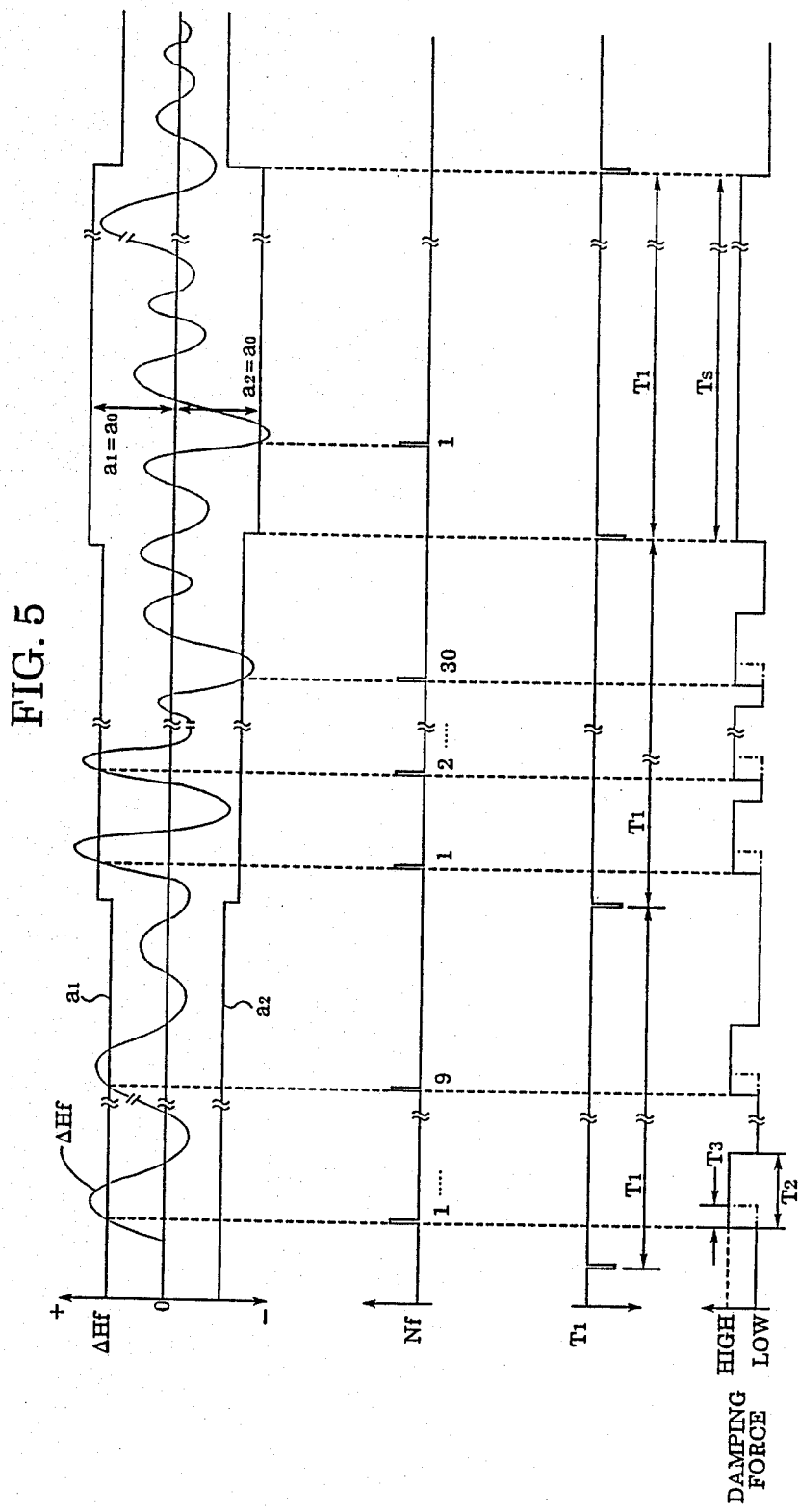
FIG. 5 is a graph showing an example of the progress of the damping control according to the flowchart in FIG. 3.

Referring now to FIGS. 3, 4 and 5 a first embodiment of the present invention will be described.

In the flowchart in FIG. 3, in step 1 vehicle height Hf at the front suspension and vehicle speed V are read in from the front vehicle height sensor 36 and the vehicle speed sensor 40, respectively. Then the process proceeds to step 2.

In step 2, Hf is compared with a standard vehicle height $Hf_0$ to obtain a difference in the vehicle height, that is, $\Delta Hf = Hf - Hf_0$, and then the process proceeds to step 3. In step 3, it is checked if a predetermined standard time duration $T_1$ has lapsed or not. If the answer is yes, the process proceeds to step 4, and limit values $a_1$ and $a_2$ for the vehicle height difference are calculated according to a map such as shown in FIG. 4 and stored in ROM 48. Here the limit value $a_1$ is a positive value with respect to a positive vehicle height difference, while the limit value $a_2$ is a negative value with respect to a negative vehicle height difference. Further, in FIG. 4 Nf is a number of count or frequency which was counted during the period of $T_1$ to indicate how many times the vehicle height difference has exceeded the positive limit value $a_1$ or the negative limit value $a_2$. Further, in FIG. 4, the uppermost line is a relation determined for $a_1$ and $-a_2$ versus Nf for the time when the vehicle is running at a relatively low vehicle speed $V_1$, the middle line is a similar line determined for the time when the vehicle is running at a medium vehicle speed $V_2$, and the lowermost line is a similar line for the time when the vehicle is running at a relatively high speed $V_3$. In these three lines the values of $a_1$ and $-a_2$ gradually increase along with increase of Nf and saturate at the values of $a_0(V_1)$, $a_0(V_2)$ and $a_0(V_3)$ according to the vehicle speeds when Nf has reached $Nf_0(V_1)$, $Nf_0(V_2)$ and $Nf_0(V_3)$, respectively. Then, in step 5 the count number Nf is reset to 0.

After step 5, or when the answer in step 3 is no, the process proceeds to step 6. In step 6, it is checked if the vehicle height difference $\Delta Hf$ is equal to or greater than $a_1$. If the answer is no, the process proceeds to step 7, and it is checked if the vehicle height difference $\Delta Hf$ is equal to or smaller than $a_2$ (negative value). If the answer is yes, the process proceeds to step 8. On the other hand, if the answer in step 6 is yes, the process proceeds to step 8 while skipping step 7.

In step 8, it is checked if the value, $\Delta Hf'$, of the vehicle height difference in the flow process just preceding to the current flow process through this flowchart is equal to or greater than $a_1$. If the answer is no, the process proceeds to step 9, and it is checked if the above-mentioned $\Delta Hf'$ is equal to or smaller than $a_2$. If the answer is no, the process proceeds to step 10, and the count number Nf is increased by one. Then the process proceeds to step 11.

On the other hand, if the answer in step 8 or 9 is yes, the process proceeds to step 11 while bypassing step 10. Further, if the answer in step 7 is no, the process proceeds to step 12, and it is checked if $a_1$ is equal to $a_0$. If the answer in step 12 is no, the process proceeds to step 13, and it is checked if $a_2$ is equal to $-a_0$. If the answer in step 13 is no, the process proceeds to step 14. In step 14 it is checked if a time $T_2$ has lapsed, and if the answer is yes or the timer for $T_2$ is not started, the process proceeds to step 15, whereas is the answer is no, the process proceeds to step 11.

On the other hand, if the answer in step 12 or 13 is yes, the process also proceeds to step 11.

The fact that the answers in steps 6 and 7 are no means that the vehicle height difference is within the upper and the lower limit values therefor, and the fact that the answers in steps 12 and 13 are no means that the count number Nf has not yet saturated. As long as such a condition continues, at least after the lapse of the time duration $T_2$ the shock absorber is set to the low damping force operation in step 15.

The fact that the answer in step 6 or 7 is yes means that $\Delta Hf$ has exceeded the upper or the lower limit, and therefore, in any event the process proceeds to step 11, and until a predetermined time duration $T_2$ lapses, the shock absorber is set to the high damping force operation. When the process proceeds through steps 8 and 9, it is meant that $\Delta Hf$ has just traversed the upper or the lower limit line, and therefore, this is counted in step 10, while if the answer in step 8 or 9 is yes, it is meant that the current overshoot of $\Delta Hf$ is not a new traversing of the limit line, and therefore, step 10 is bypassed.

In step 16, when the flow process has come from step 11, the electric control means 42 operates the front actuators 28 and 30 through driving circuits 62 and 64 to set the actuators to the high damping force operation, while when the flow process has come from step 15, the electric control means 42 operates the front actuators 28 and 30 through the driving circuits 62 and 64 to set the actuators to the low damping force operation.

The above-mentioned operations will be more clearly understood with reference to the graph shown in FIG. 5. As shown in FIG. 5, the count number Nf increases by one every time when the vehicle height difference $\Delta Hf$ traverses the upper limit value $a_1$ or the lower limit value $a_2$ until the cycle period $T_1$ lapses, and every time when the period $T_1$ lapses, the count number Nf is reset to 0. As shown in FIG. 4, the limit value $a_1$ or $-a_2$ increases as the count number Nf increases until it reaches $a_0$ determined for a particular vehicle speed. Before the limit value $a_1$ or $-a_2$ reaches $a_0$ and saturates, the shock absorber which was set to the high damping force operation with the traversing of the vehicle height difference across the limit value $a_1$ or $-a_2$ is returned to the low damping force operation after the lapse of $T_2$. However, when the limit value $a_1$ or $-a_2$ has once reached the saturation value $a_0$, as the step 14 is bypassed, the shock absorber is continually set to the high damping force operation for a substantially increased time duration such as Ts which, in this embodiment, is equal to $T_1$, until $T_1$ lapses, as shown in FIG. 5, and then probably because of a subsidence of roughness of the road in the meantime, at the time of next checking of $a_1$ or $a_2$ in step 4, the shock absorber will be returned to the low damping force operation through step 14 after the lapse of time duration $T_2$.

As a modification, as shown in FIG. 5, the setting up of the shock absorber to the high damping force operation may be delayed for a short period $T_3$ so as to avoid the abrupt relative movement between the vehicle wheel and the vehicle body which exceeded the limit value $a_1$ or $a_2$ giving a larger shock to the vehicle body under the increased damping force of the shock absorber.

Further, although the positive limit value $a_1$ and the negative limit value $a_2$ are separately handled in the flowchart in FIG. 3, these positive and negative limit values may have the same absolute value so that the absolute value of $\Delta Hf$ is compared with only a positive limit value.

Figure 6:
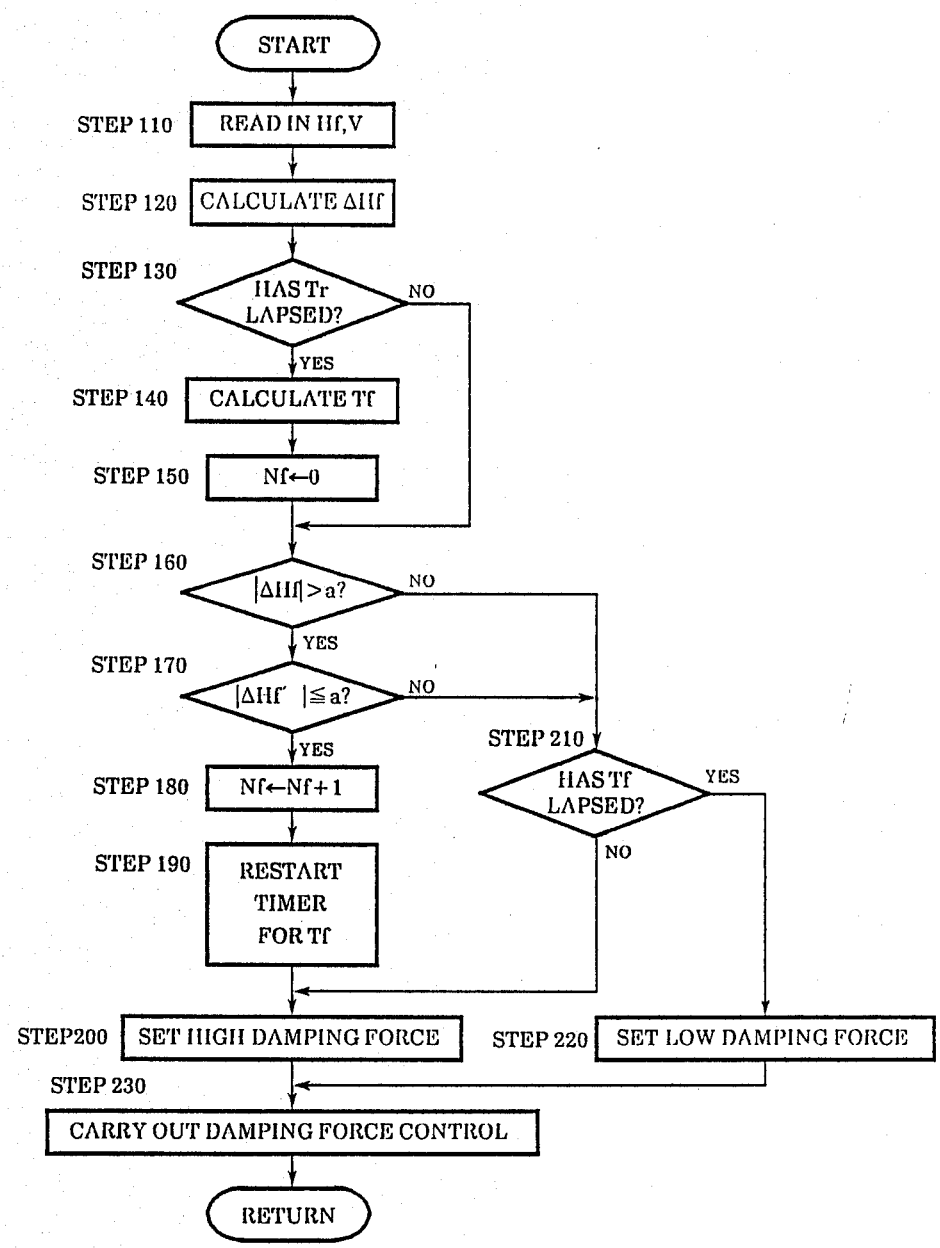
FIG. 6 is a flowchart showing the control operation of another embodiment of the damping force control system according to the present invention.
Figure 7:
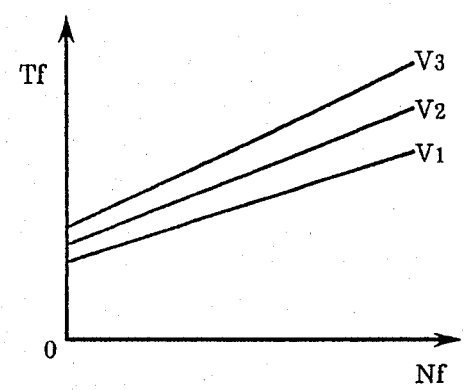
FIG. 7 is a graph showing a relationship between the frequency of the displacement between the vehicle wheel and the vehicle body exceeding a predetermined limit value and a time duration of setting the shock absorber at a high damping force operation according to the flowchart in FIG. 6.
Figure 8:
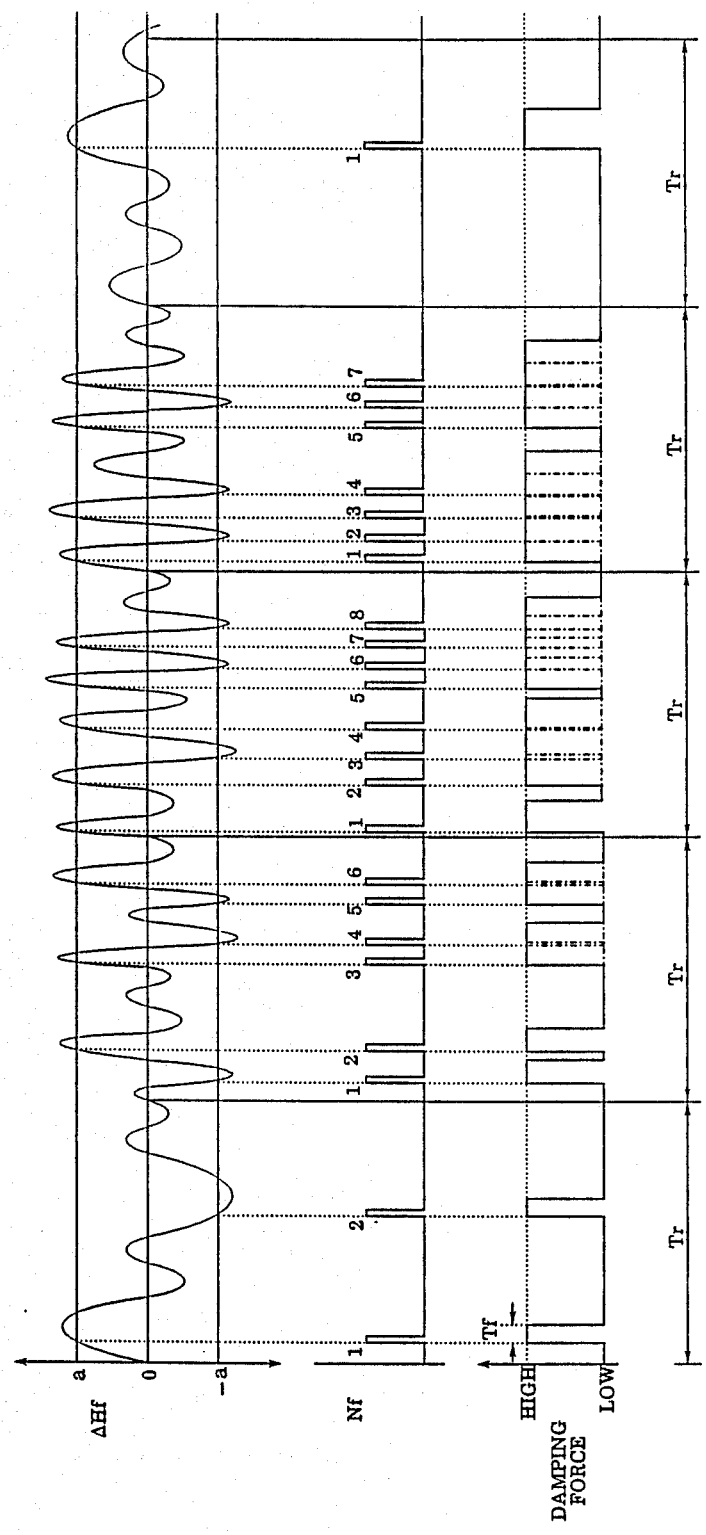
FIG. 8 is a graph showing an example of the progress of the damping control according to the flowchart shown in FIG. 6.

FIG. 6 is a flowchart similar to FIG. 3 showing the operation of a second embodiment of the damping force control system for the shock absorber according to the present invention. Control processes according to the flowchart of FIG. 6 will be described also with reference to FIG. 7 which shows a relation between the count number Nf of the vehicle height difference exceeding a limit value versus a time duration Tf for setting up the shock absorber for high damping force operation and FIG. 8 showing the progress of the vehicle height difference, the count number and the damping force.

In step 110, the vehicle height Hf at the front wheels and the vehicle speed V are read in, and in step 120 the vehicle height difference $\Delta Hf$ of the vehicle height Hf from a standard value therefor $Hf_0$ is calculated. Then the process proceeds to step 130.

In step 130, it is checked if a standard time duration Tr has lapsed or not. If the answer is yes, the process proceeds to step 140 and the value of Tf is obtained from a map bearing the relation between the count number Nf of the vehicle height difference exceeding the limit value a within the standard time Tr as counted in a later step described hereinunder and the time duration Tf for setting the shock absorber at the high damping force operation. As shown in FIG. 7, Tf is increased along with increase of Nf, and further each Tf value is modified according to the vehicle speed so that Tf is larger as the vehicle speed is higher ($V_1 < V_2 < V_3$). The map is also stored in ROM 48. Then the process proceeds to step 150, and the count number Nf is reset to 0. Then the process proceeds to step 160.

On the other hand, if the answer in step 130 is no, the process proceeds to step 160 while bypassing steps 140 and 150.

In step 160 it is checked if the absolute value of $\Delta Hf$ is greater than a limit value a which in this embodiment may be a fixed value. If the answer is yes, the process proceeds to step 170, and it is checked if the absolute value of the vehicle height difference, $\Delta Hf'$, detected in the flow process of this flowchart just preceding to the current flow is equal to or smaller than a, and if the answer is yes the process proceeds to step 180. In step 180 the count number Nf is increased by one, and then the process proceeds to step 190. In step 190 the timer for counting the time Tf is restarted. Then the process proceeds to step 200.

On the other hand, when the answer in step 160 or the answer in step 170 is no, the process proceeds to step 210, and it is checked if the time duration Tf has lapsed. If the answer is no, the process proceeds to step 200, whereas if the answer is yes or if the timer for Tf is not started, the process proceeds to step 220. In step 200, it is decided to set the shock absorber to the high damping force operation, whereas in step 220 it is decided to set the shock absorber to the low damping force operation.

Then, in step 230 the actuator is operated to set the shock absorber to the high damping force operation or the low damping force operation according to step 200 or 220 from which the process proceeds.

An example of changes of the vehicle height difference $\Delta Hf$ and the corresponding progress in the counting of count numeral Nf and the corresponding switching over of the shock absorber between the high damping force operation and the low damping force operation obtained by the operation of the control system in FIG. 6 are shown in FIG. 8. As shown in FIG. 8, the traversing of the vehicle height difference $\Delta Hf$ across the upper limit value a or the lower limit value $-a$ is counted in each period of Tr, and as the count numeral Nf in the period Tr increases, the duration Tf for setting the shock absorber to the high damping force operation is increased according to the relation as shown in FIG. 7. Further, if the frequency of the vehicle height difference $\Delta Hf$ exceeding the limit value a while the shock absorber in a cycle period Tr increases so much that the vehicle height difference $\Delta Hf$ exceeds the limit value while the shock absorber is still set to the high damping force operation, the counting of the duration Tf is renewed as in step 190, and therefore the shock absorber is continually set to the high damping force operation for the renewed period as shown in FIG. 8. Thus, as the count number Nf increases, the shock absorber tends to operate continually at the high damping force operation for a substantially increased time duration Ts with a corresponding less frequency of switching over between the high damping force operation and the low damping force operation. This contributes to the durability of the shock absorber. Further, it will be noted that when the frequency of the vehicle height difference exceeding the upper limit value or the lower limit value is relatively high as in the running of the vehicle on a very rough road, the shock absorber is more continually maintained at the high damping force operation in contrast to the prior art in which the shock absorber is more continually maintained at the low damping force operation under the same condition. Therefore, according to the present invention the comfortableness in riding and the stability in maneuvering of the vehicle are ensured in the riding of the vehicle on rough roads.

Figure 9:
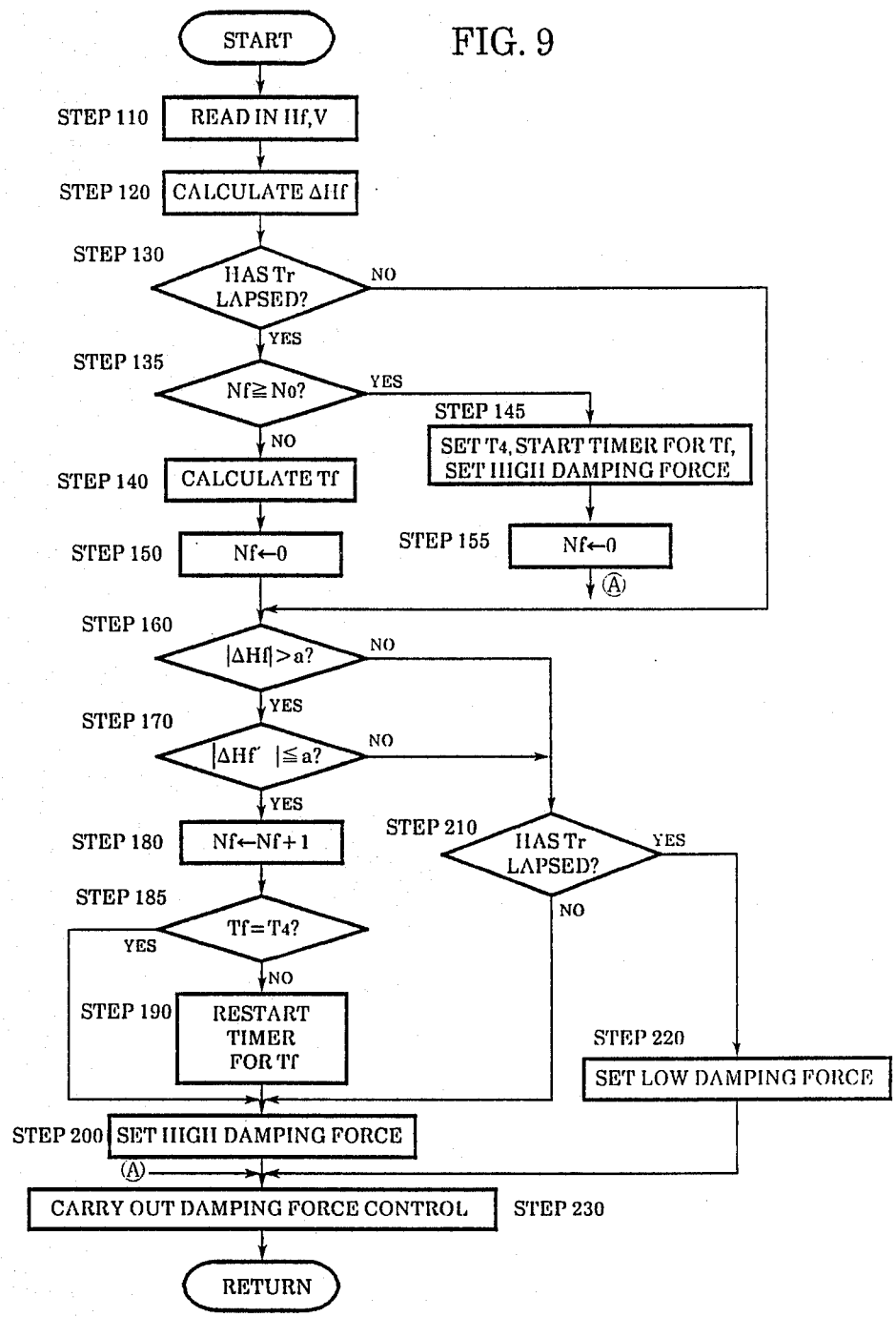
FIG. 9 is a flowchart showing the control operation of still other embodiment of the damping force control system according to the present invention.

FIG. 9 is a flowchart similar to FIGS. 3 and 6 but showing still another embodiment of the damping force control system for the shock absorber according to the present invention. Since the process carried out by the flowchart in FIG. 9 is a partial modification of that in the flowchart in FIG. 6 the steps corresponding to those in FIG. 6 are designated by the same step numbers and the descriptions for those steps will be omitted to avoid redundancy of the description, and only the modifications will be described.

Figure 10:
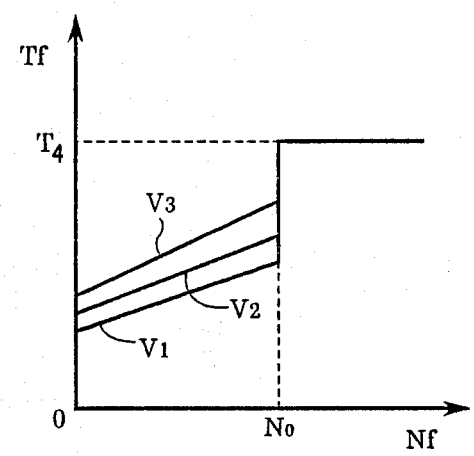
FIG. 10 is a graph showing a relationship between the frequency of the displacement between the vehicle wheel and the vehicle body exceeding a predetermined limit value and a time duration of setting the shock absorber at a high damping force operation according to the flowchart in FIG. 9.

In this third embodiment, between the steps 130 and 140 it is checked if the count number Nf is equal to or greater than a limit value $N_0$ and, if the answer is yes, the process proceeds to step 145. In step 145 the timer duration for Tf is set to a certain high value $T_4$ as shown in FIG. 10 which is a map of the relationship between the count number Nf and the duration Tf prepared for the operation according to the flowchart in FIG. 9, a timer for Tf is started, and it is decided to set the shock absorber to the high damping force operation. Then the process proceeds to step 155, where the count numeral Nf is reset to 0. Then the process proceeds to step 230 to conduct the setting of the shock absorber to the high damping force operation.

Figure 11:
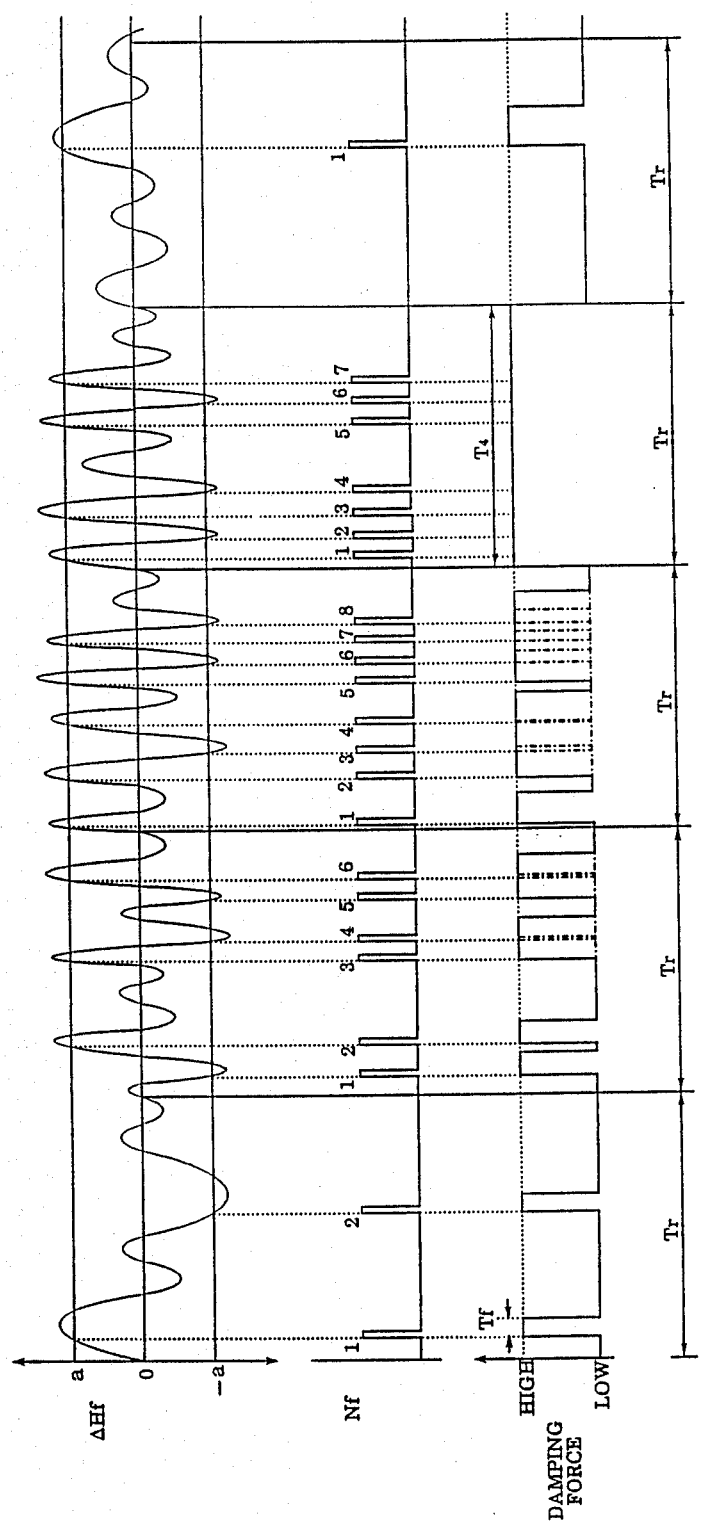
FIG. 11 is a graph showing an example of the progress of the damping control according to the flowchart shown in FIG. 9.

The time duration $T_4$ set up in step 145 may be a relatively long time which may be equivalent to the cycle time Tr as in the diagram shown in FIG. 11 which shows the progress of control obtained by the flowchart shown in FIG. 9.

On the other hand, between steps 180 and 190 it is checked if the timer for Tf has reached $T_4$. If the answer is no the process proceeds to step 190 and the timer for Tf is restarted in the same manner as in the flowchart shown in FIG. 6, whereas if the answer in step 190 is yes, the process proceeds to step 200 while bypassing step 190 to maintain the setting of the shock absorber to the high damping force operation.

The difference in switching over between the low damping force operation and the high damping force operation by the flowchart of FIG. 9 as compared with that by the flow chart of FIG. 6 will be clear from a comparison of the diagram shown in FIG. 11 with that shown in FIG. 8. For the convenience of comparison the variation of the vehicle height difference ΔHf in the diagram of FIG. 11 is the same as that in FIG. 8. According to the flowchart shown in FIG. 9, when the count numeral Nf has exceeded the limit value $N_0$, the shock absorber is continually set to the high damping force operation for the substantially increased time duration $T_4$ which in this embodiment is equivalent to Tr. After the lapse of Tr ($T_4$), since the count number Nf was reset to 0 in step 155, the answer in step 135 is no, and the process through the flowchart is returned to the process through steps 140, 150 and so on just like the processes in the flowchart of FIG. 6.

Figure 12:
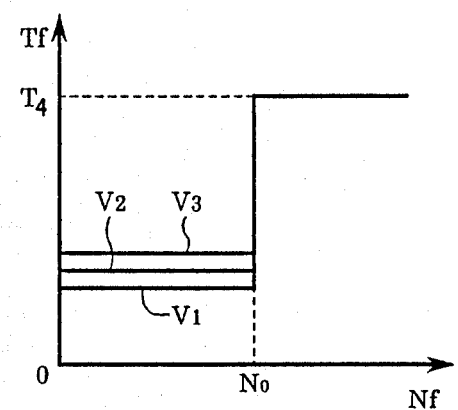
FIG. 12 is a graph showing an alternate relationship between the frequency of the displacement between the vehicle wheel and the vehicle body exceeding a predetermined limit value where vehicle speed is the determining factor for a time duration of setting the shock absorber at a high dampening force operation, prior to reaching the predetermined value, according to the flow chart in FIG. 9.

FIG. 12 shows a modification of the map for the relationship between the count number Nf and the time Tf shown in FIG. 10. In the map in FIG. 12 the time duration Tf for maintaining the shock absorber at the high damping force operation is changed only according to the vehicle speed so that it is increased only along with vehicle speed until the count number Nf reaches the limit value $N_0$. Although in the flowcharts of FIG. 6 and FIG. 9 the checking for the vehicle height difference exceeding the limit value is simplified as compared with the flowchart shown in FIG. 3 so that the absolute value of ΔHf is compared with a positive limit value a in step 160, of course this process may be replaced by steps 6 and 7 in the flowchart in FIG. 3 so that different limit values are employed for the upper limit and the lower limit of the vehicle height difference.

The damping force control system for the shock absorber according to the present invention may be constructed to be further supplied with information with regard to the distance run by the vehicle. For such a modification, in FIGS. 1 and 2 a distance recorder 70 like a mileage recorder is shown in broken lines. The operation of the electric control means 42 incorporating such means for processing information with regard to the distance run by the vehicle is shown in FIG. 13 in the form of a flowchart.

Figure 13:
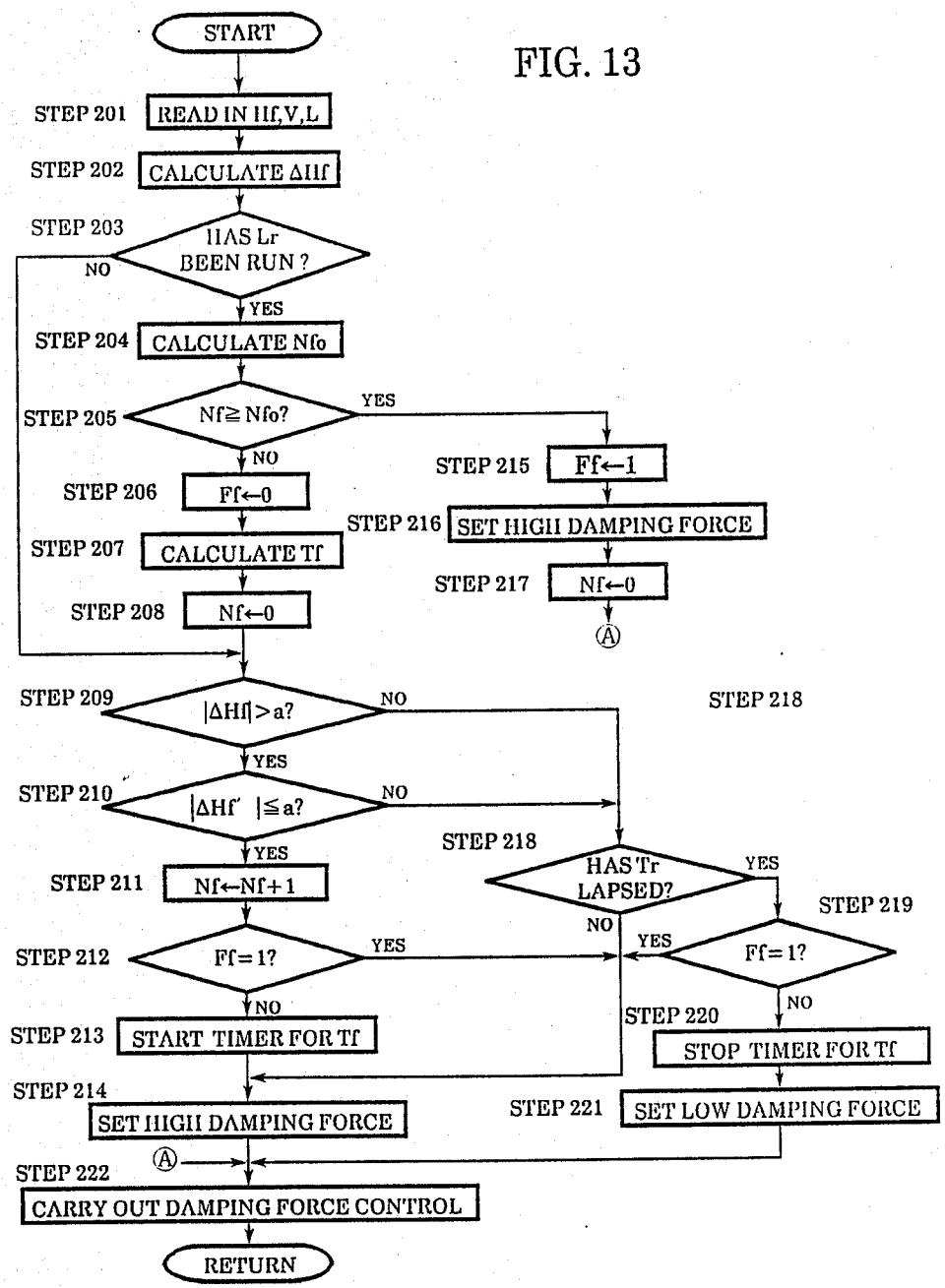
FIG. 13 is a flowchart showing the control operation of still other embodiment of the damping force control system according to the present invention.

Referring to FIG. 13, after start, in step 201 vehicle height Hf, vehicle speed V and running distance L are read in, and the process proceeds to step 202. In step 202 the vehicle height difference ΔHf is calculated, and then the process proceeds to step 203.

Figure 14:
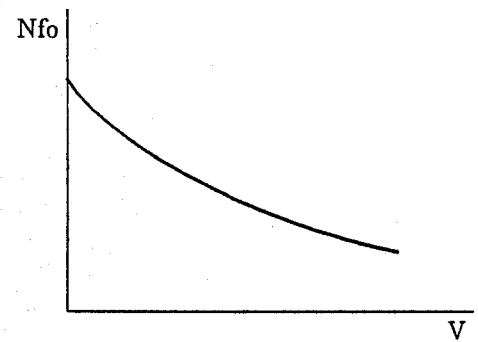
FIG. 14 is a graph showing a relationship between the vehicle speed and a limit value of the frequency of the displacement between the vehicle wheel and the vehicle body exceeding a predetermined limit value for fixing the shock absorber at a high damping force operation throughout a control cycle.

In step 203 it is checked if the running distance L has exceeded a predetermined distance Lr. If the answer is yes, the process proceeds to step 204, and a standard count number $Nf_0$ for the count number or the frequency of the absolute value of ΔHf exceeding a limit value a is obtained from a map such as shown in FIG. 14 according to the current value of vehicle speed V. As noted in FIG. 14, the standard count number $Nf_0$ is decreased along with increase of the vehicle speed. Then the process proceeds to step 205.

Figure 15:
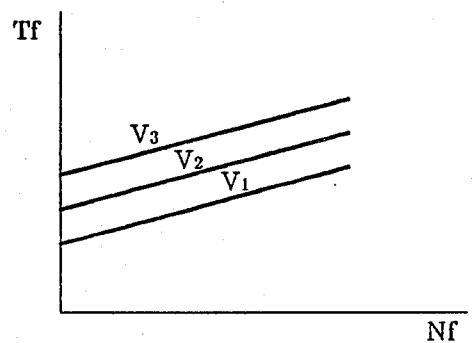
FIG. 15 is a graph showing a relationship between the frequency of the displacement between the vehicle wheel and the vehicle body exceeding a predetermined limit value and a time duration of setting the shock absorber at a high damping force operation according to the flowchart in FIG. 13.

In step 205 it is checked if Nf is equal to or greater than $Nf_0$, and if the answer is no the process proceeds to step 206, and a flag Ff is set to 0, and then the process proceeds to step 207. In step 207 the time relation Tf for setting the shock absorber to the high damping force operation is calculated from a map such as shown in FIG. 15. As noted in FIG. 15, Tf is increased along with increase of Nf and vehicle speed ($V_1 < V_2 < V_3$) in a manner similar to the map shown in FIG. 7. Then the process proceeds to step 208, and Nf is reset to 0. Then the process proceeds to step 209.

On the other hand, when the answer in step 203 is no, the process proceeds to step 209 while bypassing steps 204–208.

In step 209 it is checked if the absolute value of ΔHf is greater than the limit value a, and if the answer is yes, the process proceeds to step 210, and it is checked if the absolute value of the vehicle height difference obtained in the flow process through this flowchart just preceding to the current flow process, i.e. ΔHf', is equal to or smaller than the limit value a. If the answer is yes, it means that the absolute value of the vehicle height difference has just traversed the limit value a, and therefore the process proceeds to step 211, and the count number Nf is increased by one. Then the process proceeds to step 212. In step 212 it is checked if the flag Ff is 1, and if the answer is no, the process proceeds to step 213, and a timer Tf is started. Then the process proceeds to step 214. In step 214 it is decided to set the shock absorber to the high damping force operation.

On the other hand, if the answer in step 205 is yes, the process proceeds to step 215 and the flag Ff is set to 1. Then the process proceeds to step 216, and it is decided to set the shock absorber to the high damping force operation. Then the process proceeds to step 217, and Nf is reset to 0. Further, if the answer in step 209 or step 210 is no, the process proceeds to step 218 and it is checked if the time duration Tr has lapsed. If the answer is no, the process proceeds to step 214. Further, if the answer in step 212 is yes, the process also proceeds to step 214. In step 214 it is determined that the shock absorber is set to the high damping force operation.

As previously stated if the answer in step 218 is no the process proceeds to step 214, whereas if the answer is yes or the timer for Tr is not started, the process proceeds to step 219. In step 219 it is checked if the flag Ff is 1. If the answer is yes, the process proceeds to step 214 to decide that the shock absorber is set to the high damping force operation, whereas if the answer is no the process proceeds to step 220, and the timer for Tf is stopped, and then in step 221 it is decided that the shock absorber is set to the low damping force operation.

In step 222, when the flow process has come from step 214 or step 217, the the actuator is set to the high damping force operation, while when the flow process has come from step 221, the actuator is set to the low damping force operation.

Figure 16:
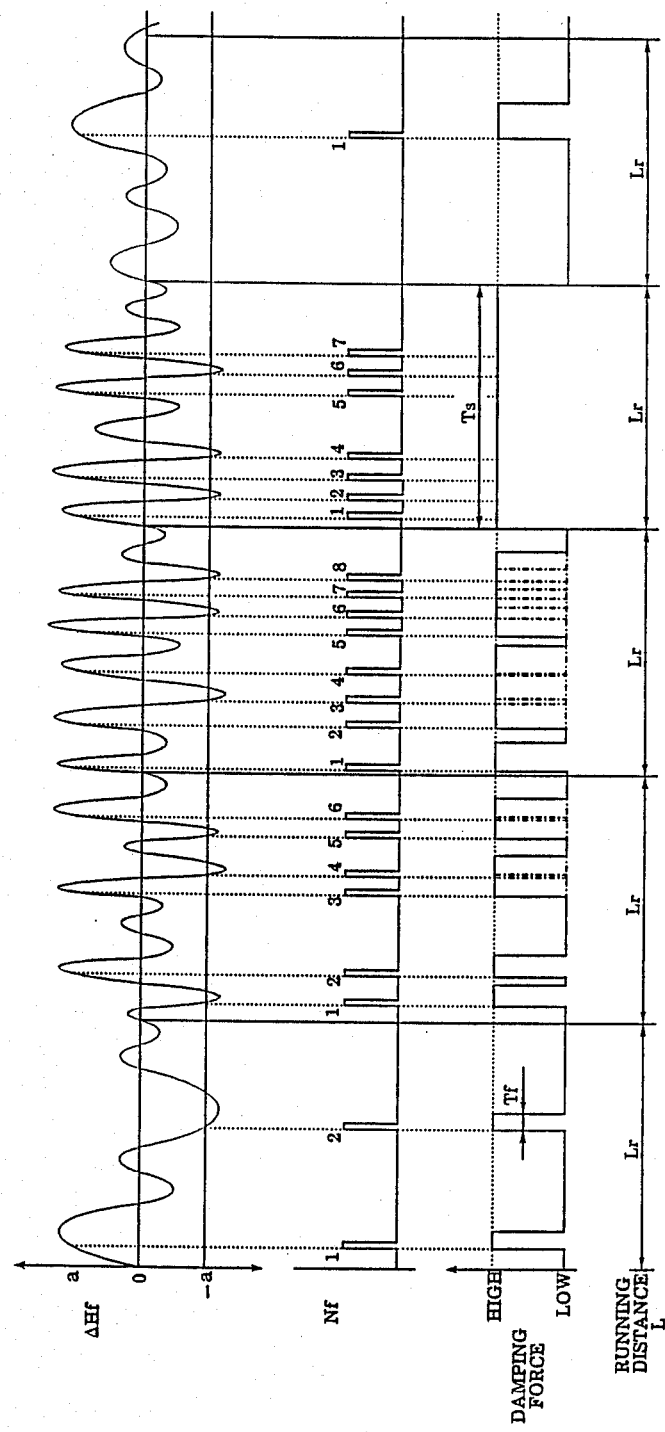
FIG. 16 is a graph showing an example of the progress of the damping control according to the flowchart shown in FIG. 13.

An example of the control performance obtained by the control operation by the flowchart shown in FIG. 13 is shown in FIG. 16. According to this embodiment the control flow according to the flowchart is repeated as the vehicle runs the standard distance Lr, and as long as the frequency of the vehicle height difference exceeding the upper limit value a or the lower limit value —a does not exceed the predetermined count number $Nf_0$, the shock absorber is set to the high damping force operation every time when the vehicle height difference exceeds the limit value, and then the high damping force operation is maintained for the duration Tf which is determined according to the count number for the vehicle height difference exceeding the limit value and the vehicle speed, while if the count number once exceeds $Nf_0$, for the next period corresponding to the running distance Lr the shock absorber is continually set to the high damping force operation.

Although the invention has been described with respect to some preferred embodiments thereof, it will be apparent to those skilled in the art that various modifications of the shown embodiments are possible without departing from the spirit of the present invention.

We claim:

1. A damping force control system for a shock absorber mounted between a vehicle wheel and a vehicle body of a vehicle such as an automobile and adapted to selectively provide a high damping force operation or a low damping force operation, comprising a vehicle height difference detecting means for detecting a vehicle height difference of the vehicle body relative to the vehicle wheel, and a shock absorber control means for controlling said shock absorber to provide said high damping force operation or said low damping force operation, said shock absorber control means controlling said shock absorber to provide said high damping force operation when said vehicle height difference exceeds a certain limit value, wherein said shock absorber control means counts a frequency of said vehicle height difference exceeding said certain limit value for each certain cycle period, and said shock absorber control means controls said shock absorber to provide said high damping force operation for a certain time duration in each said cycle period, the ratio of said certain time duration to said cycle period being varied in accordance with said frequency so that said ratio is increased along with an increase of said frequency.

2. A damping force control system according to claim 1, wherein said shock absorber control means controls said shock absorber to provide said high damping force operation continually all through said cycle period when said frequency exceeds a certain limit value.

3. A damping force control system according to claim 1, wherein said shock absorber control means controls said shock absorber to provide said high damping force operation continually for a renewed certain time duration every time when said vehicle height difference exceeds said certain limit value while said shock absorber is still providing said high damping force operation.

4. A damping force control system according to claim 1, wherein said shock absorber control means controls said shock absorber to provide said high damping force operation continually for a renewed certain time duration every time when said vehicle height difference exceeds said certain limit value while said shock absorber is still providing said high damping force operation unless said frequency exceeds a certain limit value, and to provide said high damping force operation continually all through said cycle period when said frequency exceeds said certain limit value.

5. A damping force control system according to claim 1, wherein said cycle period for counting said frequency is a cycle period for repetitive control operation of the damping force control system.

6. A damping force control system according to claim 1, wherein said for counting said frequency is based upon a distance run by the vehicle.

7. A damping force control system according to claim 1, wherein said certain limit value for said vehicle height difference is increased along with increase of said frequency at least until said frequency reaches a certain value.

8. A damping force control system according to claim 1, wherein said certain limit value for said vehicle height difference is decreased along with increase of vehicle speed for a same value of said frequency.

9. A damping force control system according to claim 2, wherein said certain limit value for said frequency is decreased along with increase of vehicle speed.

10. A damping force control system according to claim 1, wherein said shock absorber control means controls said shock absorber to provide said high damping force operation after the lapse of a determinate delay time from a time point at which said vehicle height difference exceeds said certain limit value.

* * * * *